US011231576B2

(12) United States Patent
Franke et al.

(10) Patent No.: US 11,231,576 B2
(45) Date of Patent: Jan. 25, 2022

(54) METHOD AND MICROSCOPE FOR DETERMINING A FLUORESCENCE INTENSITY

(71) Applicant: Carl Zeiss Microscopy GmbH, Jena (DE)

(72) Inventors: Christian Franke, Dresden (DE); Markus Sauer, Heidelberg (DE); Sebastian van de Linde, Bearsden (GB)

(73) Assignee: Carl Zeiss Microscopy GmbH, Jena (DE)

( * ) Notice: Subject to any disclaimer, the term of this patent is extended or adjusted under 35 U.S.C. 154(b) by 346 days.

(21) Appl. No.: 16/461,908

(22) PCT Filed: Nov. 20, 2017

(86) PCT No.: PCT/EP2017/079750
§ 371 (c)(1),
(2) Date: May 17, 2019

(87) PCT Pub. No.: WO2018/091704
PCT Pub. Date: May 24, 2018

(65) Prior Publication Data
US 2019/0331907 A1    Oct. 31, 2019

(30) Foreign Application Priority Data

Nov. 21, 2016   (DE) .................... 10 2016 014 133.6
Jun. 29, 2017    (DE) .................... 10 2017 211 031.7

(51) Int. Cl.
*G06K 9/00*       (2006.01)
*G02B 21/36*      (2006.01)
(Continued)

(52) U.S. Cl.
CPC ....... *G02B 21/367* (2013.01); *G01N 21/6458* (2013.01); *G02B 21/008* (2013.01); *G02B 21/0032* (2013.01); *G02B 21/16* (2013.01)

(58) Field of Classification Search
None
See application file for complete search history.

(56) References Cited

U.S. PATENT DOCUMENTS 7,880,149 B2      2/2011   Bewersdorf et al.
2013/0256563 A1  10/2013   Kalkbrenner et al.
(Continued)

FOREIGN PATENT DOCUMENTS

WO    2015130792 A1    9/2015
WO    2015160690 A1    10/2015
WO    2016049544       3/2016

OTHER PUBLICATIONS

Tsukanov et al., "Developing DNA nanotechnology using single-molecule fluorescence" (Year: 2014).*
(Continued)

*Primary Examiner* — Soo Jin Park
(74) *Attorney, Agent, or Firm* — Duane Morris LLP (57) ABSTRACT

Method and microscope for determining a fluorescence intensity which is integrated over a partial region of an isolated intensity distribution, from a first individual image is corrected by means of a background intensity value, integrated over the same image region, from another individual image in which this image region is free from fluorescence. The axial position can be ascertained on the basis of two thus corrected fluorescence intensity values from, in each case, different partial regions of the intensity distribution.

25 Claims, 5 Drawing Sheets

(51) Int. Cl.
   *G01N 21/64*   (2006.01)
   *G02B 21/00*   (2006.01)
   *G02B 21/16*   (2006.01)

(56) References Cited

U.S. PATENT DOCUMENTS

2016/0327779 A1    11/2016   Hillman
2017/0038574 A1     2/2017   Zhuang et al.
2017/0176337 A1     6/2017   Kalkbrenner
2017/0220733 A1     8/2017   Zhuang et al.

OTHER PUBLICATIONS

Preus, Soren, et al.; "Optimal Background Estimators in Single-Molecule FRET Microscopy"; Biophysical Journal 2016; 111:1278-1286.
Uphoff, Stephan, et al.; "Monitoring multiple distances within a single molecule using switchable FRET"; Nature Methods 2010; 7(10):831-836 and Online Methods.
Ma, Ye, et al.; "3D dual-virtual-pinhole assisted single particle tracking microscopy"; Journal of Optics 2014; 16:1-9.
Deschout, Hendrik, et al.; "Precisely and accurately localizing single emitters in fluorescence microscopy"; Nature Methods 2014; 11(3):253-266.
Klein, Teresa, et al.; "Eight years of single-molecule localization microscopy"; Histochem Cell Biology 2014; 141:561-575.
Translation of the International Preliminary Report on Patentability and Written Opinion of the International Searching Authority.

\* cited by examiner

METHOD AND MICROSCOPE FOR DETERMINING A FLUORESCENCE INTENSITY

RELATED APPLICATIONS

The present application is a U.S. National Stage application of International PCT Application No. PCT/EP2017/079750 filed on Nov. 20, 2017, which claims priority benefit of German Application No. DE 10 2016 014 133.6 filed on Nov. 21, 2016 and German Application No. DE 10 2017 211 031.7 filed on Jun. 29, 2017, the contents of each are incorporated by reference in their entirety.

FIELD OF THE INVENTION

The invention relates to a method for ascertaining a fluorescence intensity, wherein a plurality of two-dimensional individual images off sample are recorded using a microscope, wherein the same sample region is contained in each of the individual images and different emitters are excited to emit fluorescence during the recording of the individual images such that, in at least one of the individual images, at least one diffraction-limited intensity distribution of a fluorescence emission of an emitter is isolated, and the individual image with the isolated intensity distribution is ascertained and the total intensity thereof is ascertained.

BACKGROUND OF THE INVENTION

The term fluorescence in the context of the invention is understood to comprise any type of luminescence, in particular including phosphorescence. An intensity distribution in a microscope image is diffraction-limited if it has a diffraction-related extent that corresponds to an extent of a point spread function of the microscope. An intensity is isolated if it is free from overlaps with intensity distributions of other emitters if the intensity distributions lie above the statistical background.

Research areas such as systems biology, which seeks to describe biological systems using quantitative models, rely on quantitative data. It has thus far been possible to ascertain such data using fluorescence microscopy only with low accuracy, for example using a "flying spot" microscope (Pawley: "Biological Confocal Microscopy", Springer Verlag, 3rd ed. 2006, p. 6) or by "calcium imaging" (Pawley, p. 529), because a large number of error and noise sources cause intensity fluctuations. The absolute intensity of a fluorescence event is an example of a variable that is sought. Examples of error sources are the large variance of the Poisson distribution for fluorescence events, the uncertainty of the size of the microscopic detection volume, detector noise, photophysical properties such as quantum efficiency, excitation and efficiency spectra and bleaching behavior of the fluorophores used. Further uncertainties are differences between different fluorophore types, illumination inhomogeneities, and background fluorescence and autofluorescence of the sample. These errors become larger (or carry greater weight) as the examined volumes and thus the number of the examined molecules become smaller and the spatial resolution capability of the microscope increases.

However, a high resolution capability of the microscope used is necessary for high spatial accuracy. The resolution capability depends on what is known as the point spread function (PSF) of the microscope objective, which always has an extent that differs from zero (spatially: a volume that differs from zero) due to the diffraction of the light received by the sample in the microscope objective, with the result that a point-shaped light source such as a fluorescing molecule is optically imaged onto a finite area. The resolution capability of a microscope is therefore limited in principle (Abbe 1873). However, several approaches for producing images with greater resolution than permitted according to said basic limit (referred to below as "super-resolution") are known in the prior art.

WO 2006/127692 A2 discloses the use of photo-switchable fluorescent dyes for increasing the resolution capability ("photo-activated localization microscopy"; PALM). Using light having a very low intensity at an activation wavelength, an extremely small number of randomly distributed fluorescent dye molecules (fluorophores) are transformed to an excitable state (activated) and subsequently excited to fluorescence in a known manner using light having an excitation wavelength. The remaining, non-activated fluorophores cannot be excited to fluorescence by the excitation wavelength. Due to the random distribution, the activated and excited fluorophores are generally spatially separated at a distance such that the intensity distributions of the point sources resulting from the fluorescence events, which are imaged in diffraction-limited fashion, do not overlap one another (that is to say, are isolated). This is in particular also true for a projection onto a two-dimensional image in which the intensity distributions, due to the diffraction widening, extend over several image elements (picture elements; pixels) before fading into the background noise. In the PALM method, a multiplicity of individual images with a respectively low number of fluorescence events which generally do not overlap are recorded. The activation is repeated here only when the last activated fluorophores have been bleached or transformed into a non-fluorescent state. The origins of the individual fluorescence events are localized with subpixel resolution in the individual images on the basis of the diffraction-widened intensity distributions by means of curve fitting, in which a model function in the form of a Gaussian distribution is adapted to the measured two-dimensional intensity distribution, and are entered into a high-resolution resulting image.

Further variants of said individual fluorophore localization are known, which differ in terms of the procedure used for isolation. In what is known as STOR microscopy ("stochastic optical reconstruction microscopy"; STORM), the fluorophores, which are used in pairs, are switched back into their original state (deactivated) for example by means of a second light source as soon as sufficient photons have been recorded in, an individual image. There are also the methods PALMIRA ("PALM with independently running acquisition"), FPALM ("fluorescence PALM"), dSTORM ("direct STORM"), and GSDIM ("ground state depletion and individual molecule return").

The curve fitting used in all these methods for localization purposes can also be used to ascertain the absolute intensity of a fluorescence event on the basis of the volume of the adapted model function. However, it has been discovered as part of the present invention that in this case systematically an absolute intensity that is too low is obtained for the fluorescence event.

It is additionally known in microscopy to ascertain absolute intensities by means of aperture photometry (AP), which originated in astronomy. It is described for example in "Defining the Limits of Single-Molecule FRET Resolution in TIRE Microscopy" by S. J. Holden et al, in Biophysical Journal, edition 99 of November 2010, page 3102. However. AP exhibits relatively large errors. In addition, the use thereof requires strong isolation of the excited emitters with very large distances from one another in order to be able to record sufficient statistical background in the environment of a fluorescence intensity distribution. This slows the recording method, because fewer emitters are permitted to be excited at the same time in the entire sample and more individual images must be recorded to compensate for this.

A further problem in all super-resolution microscopy methods is the third dimension. The ideal would be a possibility for being able to assign a position to all identified fluorescence emitters not only in two but in three dimensions, without the need for time-consuming adjustment of the focus of the microscope. In this case, super-resolution should likewise be able to be attained axially, that is to say along the optical axis of the detection objective.

The prior art offers several approaches for this purpose. A first, optically elaborate approach is based the formation of a bijectively depth-dependent point spread function of the microscope ("PSF engineering") in the form of a double helix, as in US 2010/278400 A1. Simpler approaches, as in US 2014339439 A1, proceed from the fact that it is possible to deduce the axial location of the emitter from the extent of a diffraction-limited intensity distribution, which is ascertained from curve fitting by adapting a model function in the form of a Gaussian distribution to the measured intensity distribution. However, due to the axial symmetry of the PSF, it is not possible hereby to assign emitters outside the focal plane a unique axial position, but only a unique distance from the focal plane.

Another approach for 3D localization makes provision for the deliberate impression of an astigmatism, wherein, as in US 2011/002530 A1, the axial position of the emitter is deduced on the basis of the resulting deformation of the intensity distribution. Consequently, unique assignment on both sides of the focal plane becomes possible. The defocusing that accompanies the astigmatism, however, results in a deterioration of the lateral localization accuracy. A third approach is the simultaneous recording of two different focal planes with "conventional" (symmetrical in the axial direction) PSF, as in US 2009/242798 A1. As compared to the simple ascertainment of the axial position on the basis of the extent of the intensity distribution, the axial area of application (depth of field) here is enlarged because, in principle, a unique axial position can be assigned to each intensity distribution.

However, the resolution and the accuracy of the axial localization in all these methods are relatively low compared to the lateral resolution and accuracy.

SUMMARY OF THE INVENTION

The invention is based on the object of specifying a method of the type mentioned in the introductory part and a microscope for performing it, which make it possible to ascertain the absolute intensity of a recorded fluorescence event with low error with a measurement duration that is as short as possible. In a development, they are additionally to permit the ascertainment of an axial position of an emitter with high spatial resolution and low error and.

The object is achieved by a method having the features specified in claim 1 or claim 10, and by a microscope having the features specified in claim 17.

Advantageous refinements of the invention are specified in the dependent claims.

The invention is designed in particular, although not exclusively, for use with super-resolution microscopy methods. All methods that excite in isolated fashion the fluorescence emitters present in the sample are possible here, in particular PALM, FPALM, PALMIRA, STORM, and dSTORM.

According to the invention, the object is achieved by performing, in addition to the steps mentioned in the introductory part, the following steps:

ascertaining a first intensity value $I_{raw}$—as a raw intensity value in a (first) partial region of the isolated intensity distribution, in particular in the entire isolated intensity distribution—provided it is above the statistical background—, by integrating the recorded intensities of relevant image elements of the individual image, ascertaining at least one further one of the individual images, which is, at least in an image region corresponding to the (first) partial region of the isolated intensity distribution, free from fluorescence emissions (which lie above the statistical background), in particular free from an emission of the emitter to which the isolated intensity distribution contained in the (first) partial region of the first individual image belongs, ascertaining a second intensity value $I_{BG}$—as background intensity value in the image region of the other individual image by integrating the recorded intensities of relevant image elements of the other individual image, and ascertaining an adjusted fluorescence intensity I as a difference $I_{raw}-I_{BG}$ between the first intensity value $I_{raw}$ and the second intensity value $I_{BG}$.

The core of the invention is thus the use of other images of a time series for background correction instead of the environment of the isolated intensity distribution in the same individual image. In contrast to conventional aperture photometry, a higher accuracy of the background correction is attained since the not necessarily correct assumption that it is possible to draw conclusions in terms of the background from one sample region about another is dispensed with. Since the environment of the intensity distribution as compared to conventional aperture photometry plays no role in the evaluation, the requirement of sufficient distances between isolated intensity distributions is significantly weakened as compared to AP, which accelerates the isolation and thus the image recording. The most important difference as compared to the prior art, however, lies in the higher systematic accuracy of the absolute fluorescence intensities ascertained according to the invention with respect to the volume ascertainment of adapted model functions.

The isolation takes place here either in a known manner by activation and excitation, as in one of the above-described super-resolution localization methods, for example as in WO 2006/127692 A2 or US 20091242798 A1. Expediently, the sample may be provided herefor before the recording step, wherein the sample is marked with at least one photo-switchable fluorescent dye, photo-activatable fluorescent dye, or fluorescent dye blinking under optical excitation, as the emitter.

As an alternative to separate activation, isolation can be performed, as in DE 10 2015 121 920, the content of which is incorporated here to this extent, by recording the individual image with an exposure duration that is shorter than the average lifetime of the dark state of a fluorescent dye, contained in the sample, that is capable of blinking. Since at small time scales nearly all fluorescent dyes blink, it is possible to dispense with special activatable or transformable fluorescent dyes when using a highly light-sensitive detector and a correspondingly short exposure duration.

Accordingly, an activation step can also be dispensed with. Such detectors, however, are costly.

Advantageously, a plurality of other individual images can be ascertained, each of which is, at least in a respective image region corresponding to the partial region of the isolated intensity distribution, free from fluorescence emissions (save for a statistical background), and the second intensity value $I_{BG}$ can be ascertained by integrating the recorded intensities of the image elements of the relevant image region of each of the other individual images and dividing by the number of the ascertained other individual images. In this way, the accuracy of the background intensity and thus the accuracy of the ascertainment of the fluorescence intensity can be improved. If the isolation is based solely on blinking (without special activation), the image recording frequency should preferably be higher, in particular significantly higher, than a blinking frequency of one or more fluorescent dyes contained in the sample.

A particularly high accuracy of the ascertainment of the fluorescence intensity can be achieved when the partial region in which the relevant image elements of the isolated intensity distribution and of the other individual images are integrated corresponds to a discretized circular area with a radius of between 1.46 and 2.26 times a full width at half maximum of the point spread function of the microscope, in particular with a radius of 1.86 times a full width at half maximum of the point spread function.

A further aspect of the invention relates to ascertaining a coordinate (localization) for a fluorescence emitter in a third spatial dimension, in particular in the axial direction of the microscope objective, on the basis of two-dimensional individual images, for which the invention provides, in addition to the ascertainment of an adjusted first fluorescence intensity h on the basis of a first intensity value $I_{raw,1}$ and a second intensity value $I_{BG,1}$, the following steps:

ascertaining a second adjusted fluorescence intensity $I_2$ for a second partial region of the isolated intensity distribution on the basis of the same steps as for the first adjusted fluorescence intensity $I_1$ (that is to say on the basis of a dedicated first intensity value $I_{raw,2}$ and a dedicated second intensity value $I_{BG,2}$), wherein the second partial region is different from the first partial region, in particular smaller than it and in particular is contained in it, and for ascertaining, the second intensity value $I_2$ either i) the recorded intensities of the image elements of the relevant image region in the individual image or in the other individual images are integrated, or ii) the second intensity value for the first partial region is scaled to the area of the second partial region, and ascertaining a coordinate value for the emitter on the basis of the first adjusted fluorescence intensity and the second adjusted fluorescence intensity, in particular on the basis of a quotient $I_2/I_1$ of the second adjusted fluorescence intensity $I_2$ and the first adjusted fluorescence intensity $I_1$ or on the basis of the reciprocal thereof.

In other words, the absolute fluorescence intensities $I_1$ and $I_2$ are determined for two different partial regions of the same intensity distribution, specifically in each case from the raw intensity and the background intensity in the respective partial region. In this way, localization of the emitter in a third spatial dimension is possible in particular with super-resolution with a greater accuracy than in the prior art. Experimentally, it has been possible to determine axial positions with super-resolution with an accuracy of 16 nm. The ascertained coordinate can describe an absolute position here, although it does not have to. It can also be another, z-dependent variable, in particular a photometric characteristic variable.

Advantageous are embodiments in which the first partial region and the second partial region have identical shapes, in particular circular areas, but are of different sizes, in particular in concentric arrangement in relation to one another. This permits localization in the third dimension with the highest accuracy. It is possible here to use, other shapes such as squares or higher-order polygons (n-gon with n=5, 6, 7, 8, . . . ). However, it is also possible to use only radial segments of such circular areas or of such polygons as partial regions.

For example, if the first partial region is a circular ring containing, the adjusted intensity $I_1$, and the second partial region is the circular area, inside the circular ring, containing the adjusted intensity $I_2$, it is also possible to use instead the total area of the external circle of the circular ring containing the adjusted intensity $I_1=I_{1'}+I_2$ as the first partial region. The resulting reciprocals of the abovementioned quotients differ from one another merely by the absolute value of 1:

$$\frac{I_1}{I_2} = \frac{I_{1'} + I_2}{I_2} = \frac{I_{1'}}{I_2} + 1$$

Of particular advantage are embodiments in which two individual images with focal positions that differ in the third spatial dimension are recorded simultaneously, in particular by splitting a detection beam path into two sections of different optical path lengths up to the detection, in particular into different regions of the same detector. High-resolution axial localization in a large depth region is possible with the greater depth of field that is attainable in this way. In particular, the method and the microscope from US 2009/242798 A1, the content of which is to this extent incorporated herein, can be used for this type of detection. In experiments, it was possible to demonstrate an axial super-resolution in a depth region of more than 800 nm.

It may be advantageous to correct or substitute the second adjusted fluorescence intensity by means of curve fitting on the basis of a model function for the intensity distribution in the second partial region, wherein the originally ascertained second adjusted fluorescence intensity is used in the curve fitting. In this way it is also possible to take into account subpixel intensity information. In particular, this can be advantageous if the second partial region comprises only few whole pixels. The curve fitting is preferably performed with a fixed (specified) full width, at half maximum.

The coordinate value can expediently be ascertained based on specified calibration values, in particular using a saved table of quotients of fluorescence intensities for different coordinate values in the third dimension. This permits ascertainment of an absolute position in the third dimension. Additionally, the coordinates which have been ascertained in this manner can be corrected to compensate deviations in the refractive index, as in "Orientation imaging of single molecules by wide-field epifluorescence microscopy" by M. Bohmer & J. Enderlein in J. Opt. Soc. Am. B 20, 554-559 (2003), or in "Image analysis, of defocused single-molecule images for three dimensional molecule orientation studies" by D. Patra et al. in J. Phys. Chem. A 1.08, 6836-6841 (2004).

Even without the highly accurate correction of the statistical background of the isolated intensity distribution is it possible according to the invention for localization in the third dimension to be effected on the basis of a photometric characteristic variable. For such a method for evaluating a two-dimensional microscope image containing intensity distributions of fluorescence events of a sample marked with at least one fluorescent dye, wherein the intensity distributions have a respective diffraction-related extent, which corresponds to an extent of a point spread function of the microscope, and at least one intensity distribution of an individual one of the fluorescence events is isolated, provision is made of the following steps:

ascertaining an integrated first intensity value in a first partial region of the overlap-free intensity distribution, in particular in the entire isolated intensity distribution, ascertaining an integrated second intensity value in a second partial region of the overlap-free intensity distribution, wherein the second partial region differs from the first partial region, in particular is smaller than the first partial region and is contained therein, and ascertaining a photometric characteristic variable of the isolated intensity distribution on the basis of the first intensity value and of the second intensity value. In particular on the basis of a quotient of the two intensity values.

The first and second intensity values can be adjusted, for example, for the statistical background using conventional aperture photometry. To this end, a background intensity value in a fluorescence-emission-free environment outside the sum of the first and second partial regions, for example in a circular ring around the first partial region, can be ascertained and, scaled to the area of the respective partial region, be subtracted in each case from the integrated first and second intensity values before the photometric characteristic variable is ascertained.

For localization, the isolated intensity distribution can then be assigned a position in a third spatial dimension on the basis of the photometric characteristic variable, in particular with storage of the microscope image together with the assigned position. For the sake of simplicity, the position can even be the ascertained value of the characteristic variable. Alternatively, the value of the characteristic variable can be converted into an absolute position on the basis of stored (separately ascertained) calibration values.

For recording the microscope image, the sample is preferably irradiated by means of at least one light source and recorded in a diffraction-limited manner by means of a light receiver such that at least one fluorescence event occurs that causes in the recorded, image at least one isolated intensity distribution having a diffraction-related extent which corresponds to an extent of a point spread function of the microscope.

The sample can expediently be marked with at least one type of transformable fluorophores as emitters and initially a subset of the transformable fluorophores can be transformed into an excitable state before the recording of each of the individual images such that the transformed excitable fluorophores at least locally have a lower density than specified by a reciprocal of a volume which is unresolvable for diffraction-related reasons, wherein the sample is irradiated by means of a light source at least partially with excitation light and, for recording the individual images, fluorescence radiation emitted by the sample is imaged in diffraction-widened fashion onto at least one light receiver by means of a microscope objective.

The transformation can be effected by chemical or optical means. The optical switching method is used for example in PAL microscopy and STOR microscopy. After the recording of the microscope image (or of further microscope images, i.e., individual images), the activated fluorophores can be deactivated (that is, transformed into a non-excitable state), for example by bleaching. In a further recording cycle, a (stochastic) subset of the transformable fluorophores with a sufficiently low density can again be activated and excited. In an advantageous embodiment, a laser scanning microscope is used for the transforming into the excitable state. It is thereby possible to perform activation, or transformation into the excitable state, locally, for example ROI-selectively.

In special embodiments, the fluorescence events can originate from spectrally differently emitting fluorescent dye types. In particular, the image elements of the individual images can be spectrally unmixed or separated before the ascertainment of an intensity. In this way, a plurality of fluorophore types can be localized in one measurement.

For lateral localization, a two-dimensional location of a centroid of an isolated intensity distribution of a fluorescence event can advantageously be ascertained by means of curve fitting with sub-diffraction-limited accuracy. In this way, super-resolution in all three spatial dimensions can be attained.

The invention also comprises control units and computer programs, in particular stored on a data carrier, which are set up for performing a method according to the invention.

In particular, the invention comprises a microscope having an illumination beam path having a light source for exciting at least one type of fluorescent dyes in a sample, in particular also for photoactivating or photo-switching a fluorescent dye, a detection beam path having a microscope objective and, arranged downstream thereof, a light receiver and having a control unit set up for performing a method according to the invention and connected to the light source, and the light receiver.

Individual images can be recorded in particular with excitation of fluorescence exclusively in a thin layer, for example at a totally internally reflective interface (TIRF microscopy).

BRIEF DESCRIPTION OF THE DRAWINGS

The invention is explained in more detail below on the basis of exemplary embodiments.

In the drawings.

DETAILED DESCRIPTION OF THE DRAWINGS

In all of the drawings, parts that coincide bear the same reference signs.

Figure 1:
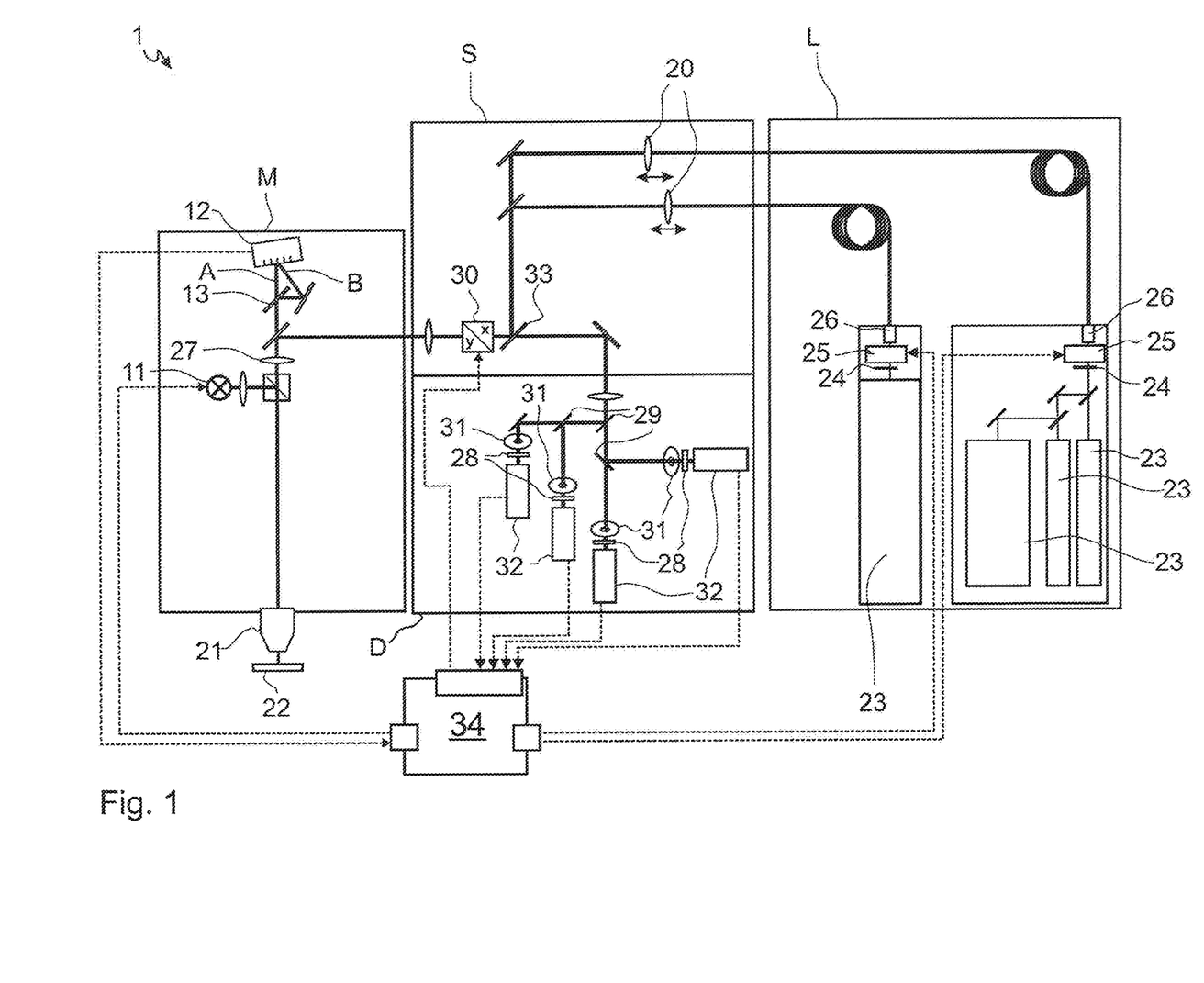
FIG. 1 schematically illustrates a microscope for recording microscope images, for highly accurately ascertaining an absolute fluorescence intensity, and for super-resolution localization in three spatial dimensions.

FIG. 1 schematically illustrates a microscope 1, the control unit 34 of which is set up for performing the method according to the invention. The microscope 1 is equipped not only with a light source 11 and a camera 12, in front of which a beam splitter 13 is arranged, in each case for wide field illumination and recording of two-dimensional images, but also as a laser scanning microscope (LSM). The LSM is put together in a modular manner from an illumination module L with lasers 23, a scanning module 5, a detection module D, and the microscope unit M with the microscope objective 31. The light from the lasers 23 can be influenced by the control unit 34 by way of light doors 24 and attenuators 25 before it is fed into, and combined in, the scanning unit S by way of optical fibers and coupling optical units 20. It passes, via the principal beam splitter 33 and the XY scanner 30, which has two galvanometer mirrors (not illustrated), through the microscope objective 21 to the sample 22, where it illuminates a focal volume (not illustrated). Light that is reflected by the sample or emitted fluorescence light passes through the microscope objective 21 to the camera 12 or, via the scanner 30, through the principal beam splitter 30 into the detection module D. The principal beam splitter 30 can be embodied as a dichroic color splitter, for example. The detection module D comprises a plurality of detection channels, each with a pinhole stop 31, a filter 28 and a photomultiplier 32, which are separated by color splitters 29. It is also possible to use slot diaphragms (not depicted here) instead of, pinhole stops 31, for example in the case of line-shaped illumination. The confocal pinhole stops 31 serve to discriminate sample light which does not originate from the focal volume. The photomultipliers 32 therefore detect only light from the focal volume. The focal volume of the sample 22, which is illuminated and recorded confocally, is able to be moved over the sample 22 by means of the scanner 30 in order to record an image pixel-by-pixel by virtue of the galvanometer mirrors of the scanner 30 being rotated in a targeted manner. Both the movement of the galvanometer mirrors and the switching of the illumination by means of the light doors 24 or the attenuators 25 are controlled directly by the control unit 34. Recording data from the photomultipliers 32 is likewise effected via the periphery interface 4.

The imaging beam path in front of the camera 12 is split by means of a beam splitter 13 into two sections A, B having different optical path lengths, which both end next to each other on different regions of the camera 12. Due to the different optical path lengths, these two regions thus record images from different planes of the sample 22. These two (parallel) focal planes differ in terms of their locations in the axial direction. This direction will be referred to below as dimension z and z-direction.

The image recording by means of light source 11 and camera 12 is independent of the setting of the scanner 30. The light source 11 can consist of two partial light sources that can be switched by the control unit 34, a first partial light source for activating (transforming into an excitable state) fluorophores with an activation wavelength and a second partial light source for exciting these fluorophores to fluorescence. However, it is likewise possible that the light source 11 emits only one single wavelength, when the isolation method used is configured accordingly.

The LSM components L, S, and D are not necessary, but can be advantageous for example for activation and excitation in individual sample regions. Accordingly, the control unit 34 can have a simplified design, for example without interfaces for such components. For example, the evaluation unit/control unit 34 can be a commercial computer with an interface for the light source 11 and camera 12.

Figures 2, 3A, 3B:
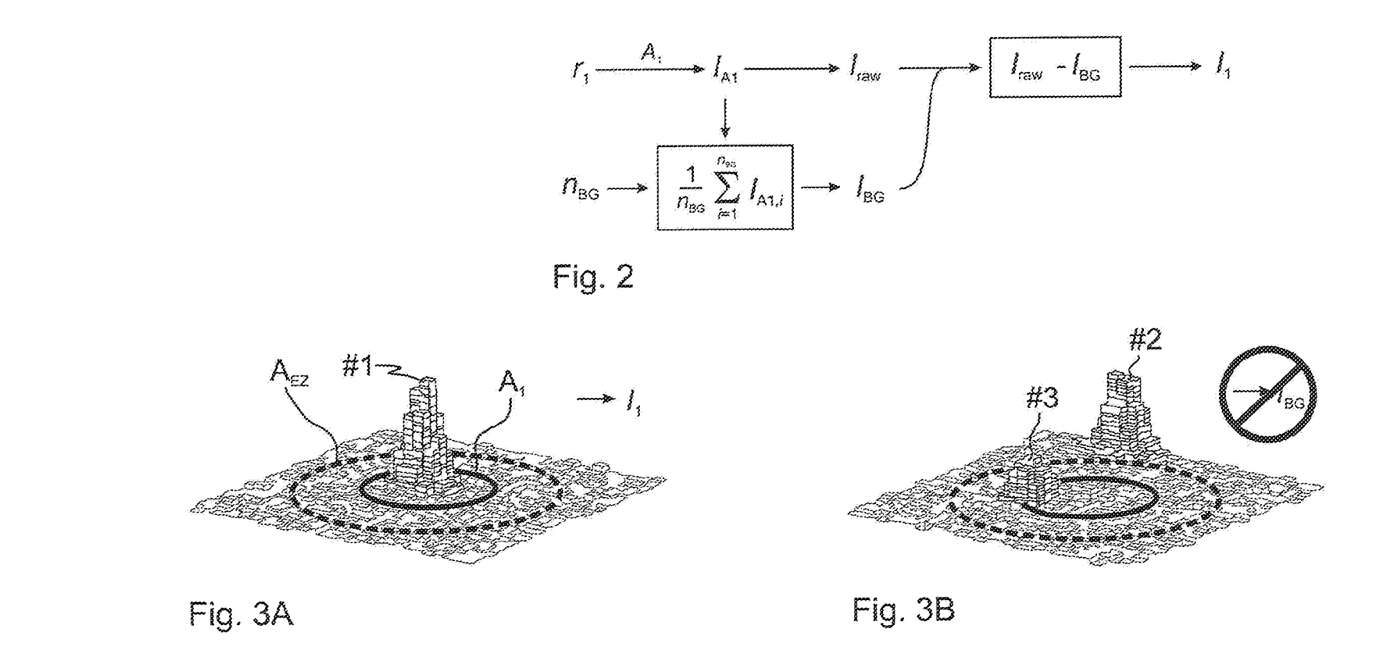
FIG. 2 is a flow chart of a method for the highly accurate ascertainment of an absolute fluorescence intensity.

FIG. 2 shows a flow chart of an example of a method according to the invention, performed by the control unit 34, for ascertaining a fluorescence intensity, wherein the steps for activation, excitation, identification and 2D localization of emitters are not shown. For the sake of better comprehension, first only individual images will be considered, which were recorded with only one (constant) focal plane.

For recording an, individual image with a sufficiently low density of fluorescent events, initially only a small number of fluorophores are transformed into their excitable state by means of the light source 11 or, depending on the location, by means of one of the lasers 23 using a weak flash of light with an activation wavelength. The selection of the subset of the actually activated fluorophores from the total set of all fluorophores located in the respective illumination field is effected here purely stochastically. The density of the activated fluorophores is here "sufficiently low" if it is less than the reciprocal of a volume that is unresolvable by the objective 21 for diffraction related reasons. Consequently, the activated fluorophores are spaced apart from one another at distances that are mostly larger than an extent of the PSF of the microscope objective 21. Using an excitation wavelength that differs from the activation wavelength, the thus transformed fluorophores are then excited. This can be done in turn using the light source 11 or, depending on the location, using one of the lasers 23.

The fluorescence radiation subsequently emitted by the excited fluorophores is recorded by means of the camera 12 in a two-dimensional individual image ("microscope image"), which is preferably saved before the quantitative evaluation. Owing to the diffraction of the incident light in the microscope objective 21, each fluorescence event is imaged with an intensity distribution into the relevant microscope image, the extent of which corresponds to the extent of the point spread function of the microscope objective 21, that is to say in the two-dimensional projection approximately to the diameter of an Airy disk. Due to the distances between the activated fluorophores (mostly greater than an extent of the PSF of the microscope objective), the intensity distributions of the fluorescence events in the microscope image are mostly overlap-free.

The activated fluorophores are subsequently deactivated by photo-switching again or by bleaching, and a new recording cycle begins with activation and excitation of the emitters in such a way that the intensity distributions of the fluorescence emissions recorded in the camera 12 are isolated, and recording into a further individual image. By repeating the recording cycle, further individual images are recorded.

Next, the individual fluorescence events in the microscope image are identified. For this purpose, the microscope image is processed, for example, first in a known manner by means of a Gaussian filter and then by means of a Laplacian filter. These filters can be implemented for example as block operators (operator matrices) which are guided pixel-by-pixel over the microscope image. For ascertaining an intensity of a filtered pixel, a block operator also takes into account the intensities of the surrounding pixels, that is to say for example a block of 5×5 pixels for the Gaussian filter and overall a block of 3×3 pixels for the Laplacian filter. The Gaussian filter removes shot noise; the Laplacian filter removes large contiguous areas. For the identification, generally only the existence of a fluorescence event in a region is ascertained and not necessarily also the location within that region. This is accomplished for example by searching sector-by-sector for a pixel or a pixel group having an intensity value that is greater than a specified identification threshold value. For example, the existence of a fluorescence event in a pixel is detected when the recorded intensity value of the relevant pixel is greater than an equivalent of 50 photons.

FIG. 3 illustrates for the purpose of explaining the method shown in FIG. 2 four details from four individual images of a time series. Each detail shows the same sample region at different times. In all details, a central circular area $A_1$ having radius $r_1$ (not illustrated, however, for simplicity) as a first partial region of the individual image is marked by a solid line. This circular area is enclosed by a circular ring $A_{EZ}$, the outer circle of which (radius $r_{EZ}$ not illustrated for simplicity) is shown by an interrupted line. In the first individual image in FIG. 3A, an intensity distribution #1 of a fluorescence emission of an emitter which has been identified on the basis of the above-illustrated localization method is located within the first partial region. Starting from the center point of the intensity distribution, which is localized with super-resolution, the first partial region is a circular area around said center point, wherein the radius $r_1$ thereof is 1.86 times the full width at half maximum (FWHM) of the intensity distribution #1. By integrating the intensities of the image elements over the area $A_1$, the raw intensity value $I_{raw}$ of the intensity distribution can be ascertained. To adjust the raw intensity value $I_{raw}$, the statistical background of the fluorescence emission must now be ascertained. Other individual images are used for this.

The radius $r_{EZ}$ is twice the radius $r_1$. The circular ring it defines represents an exclusion zone which in the other individual images must be free from fluorescence emissions so that they are able to be used to ascertain the statistical background. Since in the second individual image in FIG. 3B a fluorescence event #2 intersects the exclusion zone and additionally a further fluorescence event #3 is located in the central first partial region, this individual image cannot be used to determine and correct the background.

Figure 3C:
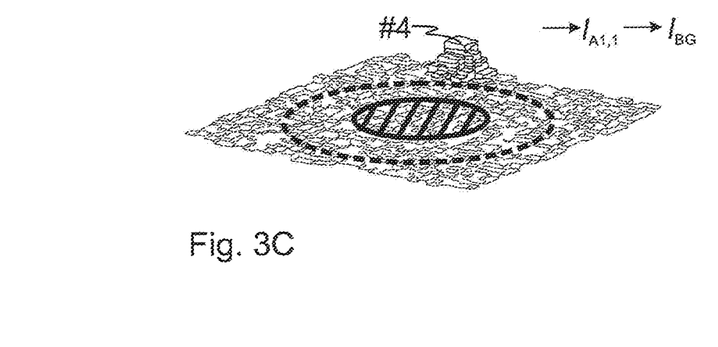
FIG. 3 illustrates as an example the same sample region in different individual images in perspective view, FIG. 4 schematically illustrates the division of an intensity distribution for localization in the axial direction.

The fluorescence event #4 in the third individual image in FIG. 3C, however, is located outside the exclusion zone. The central first partial region is also free (illustrated by hatching). The third individual image can therefore contribute to determining the background. The intensities of the image elements within the area $A_1$ are therefore integrated to a first partial value $I_{A1,1}$. Since in the fourth individual image in FIG. 3D too both the exclusion zone $A_{EZ}$ and the central first partial region $A_1$ are free, save for the statistical background, here the intensities of the image elements within the area $A_1$ are integrated, too, to give a second partial value $I_{A1}$. The average is formed from the partial values $I_{A1,1}$ and $I_{A1,2}$ as the background intensity value $I_{BG}$.

Figure 3D:
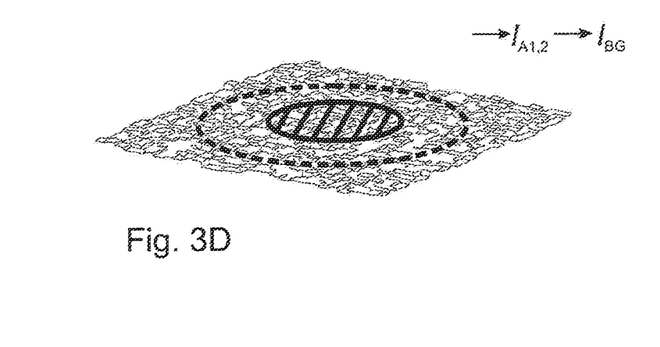

Finally, the adjusted fluorescence intensity value $I_1$ is calculated from the raw intensity value $I_{raw}$ and the background intensity value $I_{BG}$.

Figure 4:
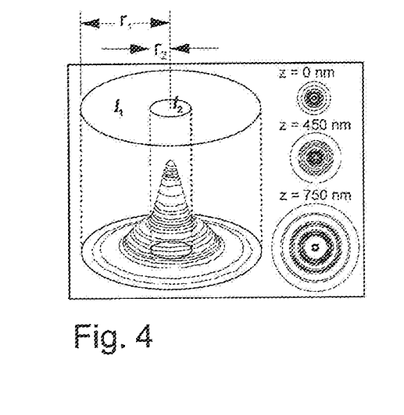

FIG. 4 shows a schematic diagram of the division of an intensity distribution, which has, for example, already been identified and localized in two dimensions, into two partial regions and, for illustrative purposes, the different, extents of fictitious intensity distributions of fluorescence emissions from different z-planes. In this example, the partial regions are formed by concentric circular areas having the radii $r_1$ and $r_2$ and the areas $A_1$ and $A_2$.

Figure 5:
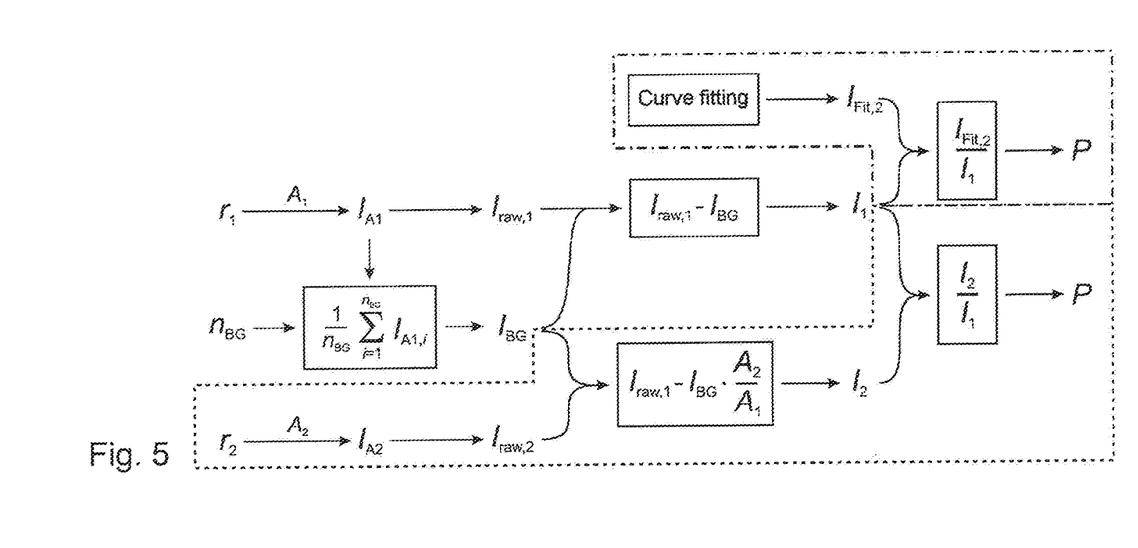
FIG. 5 is a flow chart of a method for ascertaining an axial coordinate value P in two alternative embodiments.

FIG. 5 shows the sequence for ascertaining a photometric characteristic variable P as the axial coordinate of the relevant emitter. In both partial regions of the intensity distribution from FIG. 4, the intensities of the image elements, in the areas $A_1$ and $A_2$ are integrated to respective raw intensity values $I_{raw,1}$ and $I_{raw,2}$.

As explained with respect to FIG. 3, the statistical background of the first partial region is ascertained in the form of a background intensity value $I_{BG}$ from a plurality of other individual images in which the first partial region $A_1$ is free from fluorescence emissions. The former is then used to adjust the raw intensity values $I_{raw,1}$ and $I_{raw,2}$. To this end, the background intensity value $I_{BG}$, which was determined for the first partial region $A_1$, is scaled to the size of the second partial region $A_2$ using the ratio of the areas $A_2/A_1$.

From the thus adjusted first and second fluorescence intensities $I_1$ and $I_2$ of the two partial regions, using quotient formation, the photometric characteristic variable P is ascertained as the axial coordinate of the relevant emitter and stored.

Alternatively or in addition, the photometric characteristic variable P can be determined from a quotient that takes into account a second fluorescence intensity $I_{Fit,2}$ ascertained by means of curve fitting as the numerator. In this curve fitting calculation, a Gaussian model function can be adapted to the measured intensity distributions in the second partial area $A_2$. The starting parameter used in the outlet calculation can be the second fluorescence intensity $I_2$ ascertained by integration.

Figure 6:
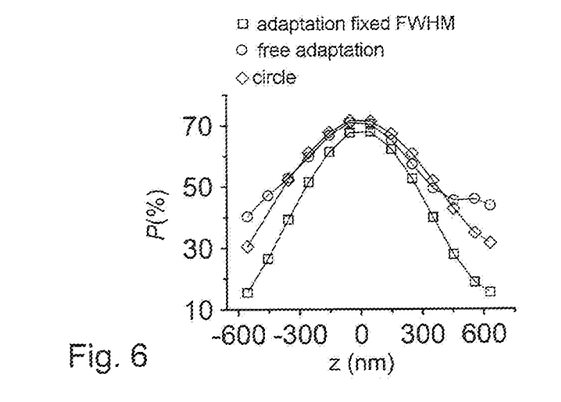
FIG. 6 shows, by way of example, results for axial coordinate values P for emitters in different axial locations from three different calculation methods.
Figure 7A:
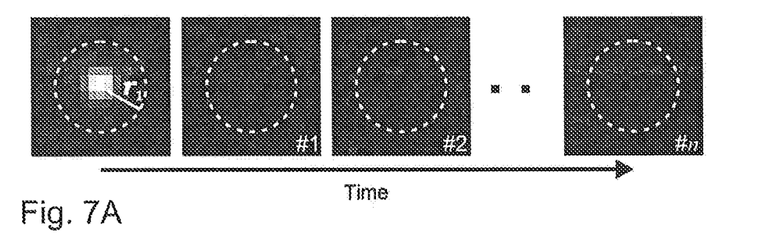
FIG. 7 shows the effects of different sizes of the first partial region by integrating the intensity distribution of a fluorescence event.
Figure 7B:
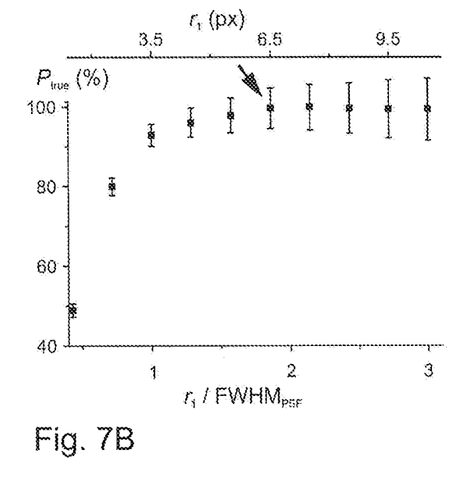
Figure 7C:
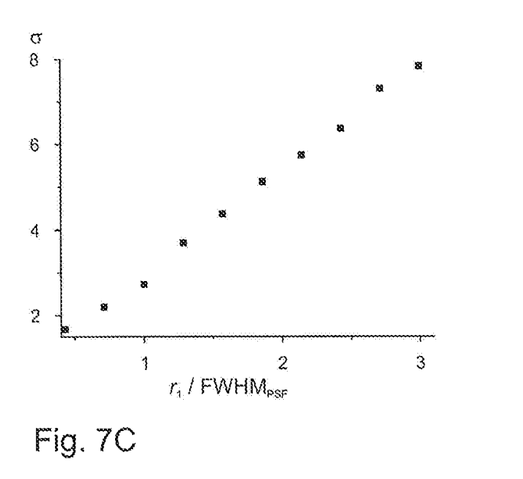
Figure 7D:
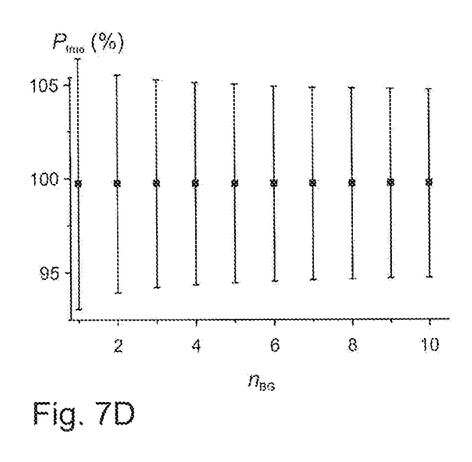
Figure 7E:
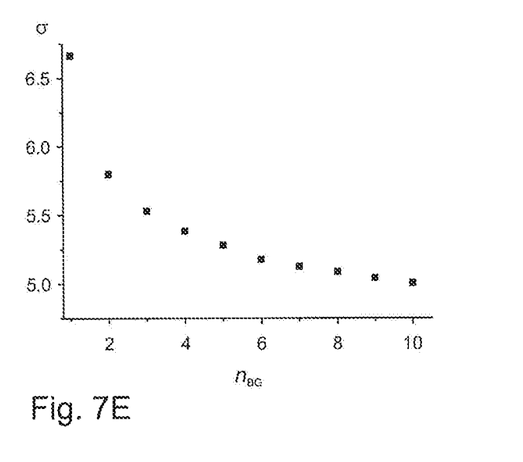

FIG. 6 shows results for axial coordinate values P for emitters in different axial locations from three different calculation methods. The data points marked by a rhombus were obtained according to FIG. 5 by integration of the measured intensities in two concentric partial regions and subtraction of the background ascertained from other individual images. The two other curves were ascertained in two customary curve fitting calculations by adapting a Gaussian function to the intensity distribution in the entire first partial region $A_1$. In one curve fitting calculation (data points shown as squares), the full width at half maximum of the Gaussian function was fixedly specified. In the other curve fitting calculation (data points shows as circles), the full width at half maximum was a free parameter. The systematic deviation of the conventional method can be seen.

FIG. 7 shows the accuracy of the method according to the invention for ascertaining an absolute fluorescence intensity first, as a function of the size of the first partial region and second as a function of the number of the other individual images used for background determination. It is apparent that the best result is achieved at a radius $r_1$ of 1.86 times the full width at half maximum (marked by an arrow). Starting from a number of seven individual images used for background ascertainment, the statistical error does not significantly decrease further.

Figure 8A:
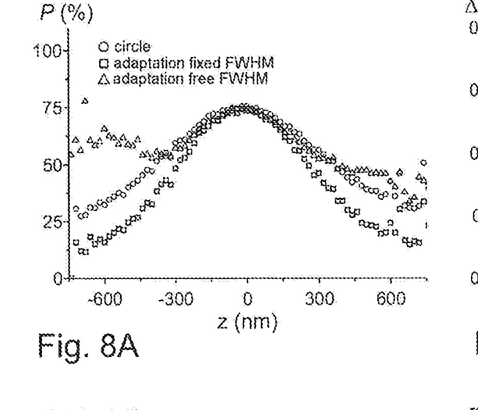
FIG. 8 shows calibration values for assigning absolute axial positions.
Figure 8B:
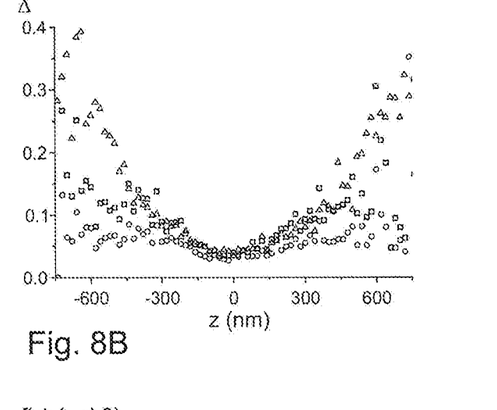

In order to be able to derive from the photometric characteristic variable P (the quotient of the adjusted fluorescence intensities in the different partial regions of an intensity distribution) an absolute spatial position, a calibration must be performed. FIG. 8 shows calibration values, ascertained by experiment, for the various evaluation methods described in FIG. 6. FIG. 8A shows the z-dependence (median) of the characteristic variable P as a function of the axial position of an individual, emitter, ascertained by means of a piezo-z scanner. FIG. 8B shows the associated relative errors for a size of the image elements of the camera 12 of 133 nm, a size of the first partial region of $r_1$=6.5 image elements (corresponding to 1.86 times a full width at half maximum), and averaging of the background over seven other individual images.

Figure 8C:
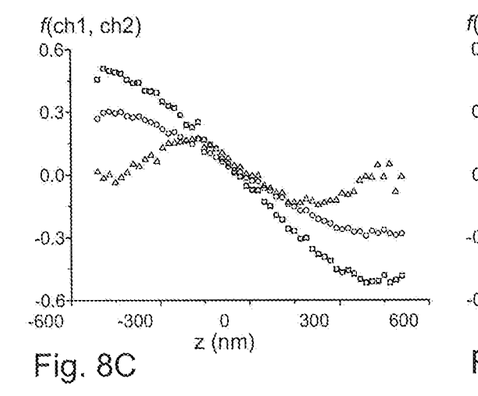

FIG. 8C shows calibration points for simultaneous individual image recordings in two different focal planes (referred to below as channels). They were calculated as f(ch1, ch2) $(P_1-P_2)/(P_1+P_2)$, wherein the photometric characteristic variable P1 was ascertained from the individual images of the first channel ch1 (corresponding to the beam path section A) and the photometric characteristic variable. P2 was ascertained from the individual images of the second channel ch2 (correspond to the beam path section B). Using interpolation between the calibration points, an absolute position z can be derived from a photometric characteristic variable P.

Figure 8D:
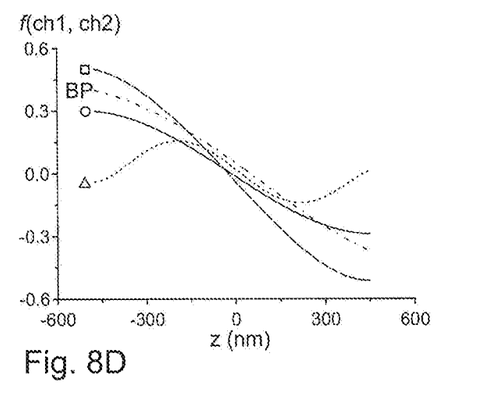

FIG. 8D shows the already interpolated calibration curves which were ascertained by adaptation of polynomials. The curve referred to as BP was calculated in accordance with $f(ch1, ch2)=-(w_1-w_2)/(w_1+w_2)$, wherein $w_1$ and $w_2$ represent the full widths at half maximum of the intensity distribution in channels one and two.

Figure 8E:
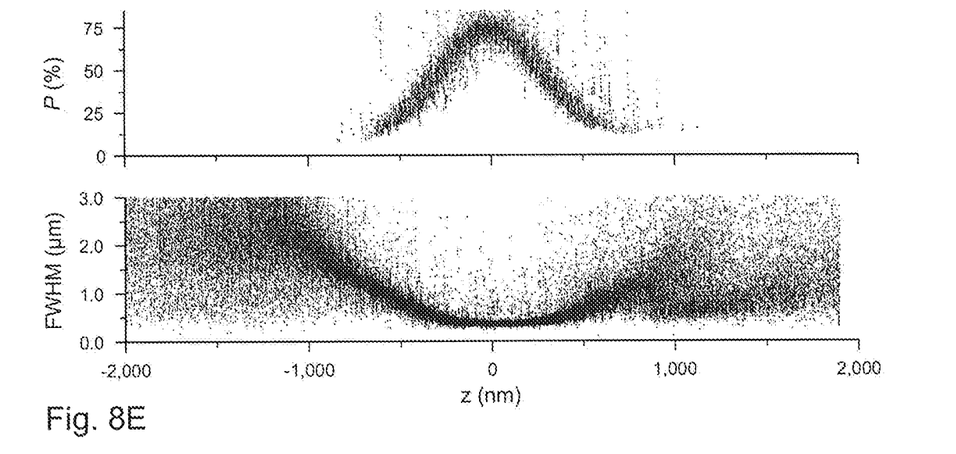

Finally, FIG. 8E shows the raw calibration curves, at the top, for the photometric characteristic variable P on the basis of photometric characteristic variables which were ascertained by experiment using adjusted intensity ratios and, at the bottom, for the associated full widths at half maximum.

While the invention has been illustrated and described in connection with currently preferred embodiments shown and described in detail, it is not intended to be limited to the details shown since various modifications and structural changes, may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Microscope
2 Microscope image
11 Light source
12 Camera
13 Beam splitter
20 Collimation optical units
21 Microscope objective
22 Sample
23 Laser
24 Light door
25 Attenuator
26 Fiber coupler
27 Tube lens
28 Filter
29 Dichroic beam splitter
30 Scanner mirror
31 Pinhole stop
32 Photomultiplier
33 Principal beam splitter
34 Control unit
D Detection module
M Microscope
L Illumination module
Scanning module
A, B Beam path sections

What is claimed is:

1. A method for ascertaining a fluorescence intensity, comprising:
a) recording a plurality of two-dimensional individual images of a sample using a microscope, wherein the same sample region is contained in each of the individual images and different emitters are excited to emit fluorescence during the recording of the individual images such that, in at least one of the individual images, at least one diffraction-limited intensity distribution of a fluorescence emission of an emitter is isolated;
b) ascertaining the individual image with the isolated intensity distribution;
c) ascertaining a first intensity value in a partial region of the isolated intensity distribution, in particular in the entire isolated intensity distribution, by integrating the recorded intensities of relevant image elements of the individual image;
d) ascertaining at least one other of the individual images, which is, at least in an image region corresponding to the partial region of the isolated intensity distribution, free from fluorescence emissions;
e) ascertaining a second intensity value in the image region of the other individual image by integrating the recorded intensities of relevant image elements of the other individual image; and
f) ascertaining an adjusted fluorescence intensity as a difference between the first intensity value and the second intensity value,
wherein the sample is marked with at least one type of transformable fluorophores as emitters and initially a subset of the transformable fluorophores are transformed into an excitable state before the recording of each of the individual images such that the transformed excitable fluorophores at least locally have a lower density than specified by a reciprocal of a volume which is unresolvable for diffraction-related reasons, and the sample is irradiated by means of a light source at least partially with excitation light and, for recording the individual images, fluorescence radiation emitted by the sample is imaged in diffraction-widened fashion onto at least one light receiver by means of a microscope objective.

2. The method as claimed in claim 1, wherein
in step d), a plurality of other individual images are ascertained, each of which is, at least in a respective image region corresponding to the partial region of the isolated intensity distribution, free from fluorescence emissions, and
in step e), the second intensity value is ascertained by integrating the recorded intensities of the image elements of the relevant image region of each of the other individual images and dividing by the number of the ascertained other individual images.

3. The method as claimed in claim 1, wherein the sample is provided before step a), and wherein the sample is marked with at least one photo-switchable fluorescent dye, photo-activatable fluorescent dye, or fluorescent dye blinking under optical excitation, as the emitter.

4. The method as claimed in claim 1, wherein the partial region in which the relevant image elements of the isolated intensity distribution and of the other individual images are integrated corresponds to a discretized circular area with a radius of between 1.46 and 2.26 times a full width at half maximum of the point spread function of the microscope, in particular with a radius of 1.86 times a full width at half maximum of the point spread function.

5. The method as claimed in claim 1, wherein the fluorescence events originate from spectrally differently emitting fluorescent dye types, in particular with spectral unmixing or separation of the image elements of the individual images before ascertainment of an intensity.

6. The method as claimed in claim 1, wherein a two-dimensional location of a centroid of an isolated intensity distribution of a fluorescence event is ascertained by means of curve fitting with sub-diffraction-limited accuracy.

7. A control unit embodying a computer program for performing a method as claimed in claim 1.

8. A microscope having an illumination beam path with a light source for exciting at least one type of fluorescent dyes in a sample, a detection beam path having a microscope objective and, arranged downstream thereof, a light receiver and a control unit as claimed in claim 7, which is connected to the light source and the light receiver.

9. The microscope of claim 8, wherein said light source is used for also photoactivating or photo-switching a fluorescent dye.

10. A nontransitory computer-readable medium embodying a computer program for performing a method as claimed in claim 1.

11. A method for evaluating a two-dimensional microscope image containing intensity distributions of fluorescence events of a sample marked with at least one fluorescent dye, wherein the intensity distributions have a respective diffraction-related extent, which corresponds to an extent of a point spread function of the microscope, and at least one intensity distribution of an individual one of the fluorescence events is isolated, comprising the following steps:
    ascertaining an integrated first intensity value in a first partial region of an overlap-free intensity distribution, in particular in the entire isolated intensity distribution;
    ascertaining an integrated second intensity value in a second partial region of an overlap-free intensity distribution, wherein the second partial region differs from the first partial region, in particular is smaller than the first partial region and is contained therein; and
    ascertaining a photometric characteristic variable of the isolated intensity distribution on the basis of the first intensity value and of the second intensity value, in particular on the basis of a quotient of the two intensity values;
    wherein the isolated intensity distribution is assigned a position in a third spatial dimension on the basis of the photometric characteristic variable, in particular with storage of the microscope image together with the assigned position.

12. The method as claimed in claim 11, wherein, for recording the microscope image, the sample is irradiated by means of at least one light source and recorded in a diffraction-limited manner by means of a light receiver such that at least one fluorescence event occurs that causes in the recorded image at least one isolated intensity distribution having a diffraction-related extent which corresponds to an extent of a point spread function of the microscope.

13. The method as claimed in claim 11, wherein the sample is marked with at least one type of transformable fluorophores as emitters and initially a subset of the transformable fluorophores are transformed into an excitable state before the recording of each of the individual images such that the transformed excitable fluorophores at least locally have a lower density than specified by a reciprocal of a volume which is unresolvable for diffraction-related reasons, and the sample is irradiated by means of a light source at least partially with excitation light and, for recording the individual images, fluorescence radiation emitted by the sample is imaged in diffraction-widened fashion onto at least one light receiver by means of a microscope objective.

14. The method as claimed in claim 11, wherein the fluorescence events originate from spectrally differently emitting fluorescent dye types, in particular with spectral unmixing or separation of the image elements of the individual images before ascertainment of an intensity.

15. The method as claimed in claim 11, wherein a two-dimensional location of a centroid of an isolated intensity distribution of a fluorescence event is ascertained by means of curve fitting with sub-diffraction-limited accuracy.

16. A control unit embodying a computer program for performing a method as claimed in claim 11.

17. A microscope having an illumination beam path with a light source for exciting at least one type of fluorescent dyes in a sample, a detection beam path having a microscope objective and, arranged downstream thereof, a light receiver and a control unit as claimed in claim 16, which is connected to the light source and the light receiver.

18. The microscope of claim 17, wherein said light source is used for also photoactivating or photo-switching a fluorescent dye.

19. A nontransitory computer-readable medium embodying a computer program for performing a method as claimed in claim 11.

20. A method for ascertaining a fluorescence intensity, comprising:
    a) recording a plurality of two-dimensional individual images of a sample using a microscope, wherein the same sample region is contained in each of the individual images and different emitters are excited to emit fluorescence during the recording of the individual images such that, in at least one of the individual images, at least one diffraction-limited intensity distribution of a fluorescence emission of an emitter is isolated;
    b) ascertaining the individual image with the isolated intensity distribution;
    c) ascertaining a first intensity value in a partial region of the isolated intensity distribution, in particular in the entire isolated intensity distribution, by integrating the recorded intensities of relevant image elements of the individual image;
    d) ascertaining at least one other of the individual images, which is, at least in an image region corresponding to the partial region of the isolated intensity distribution, free from fluorescence emissions;
    e) ascertaining a second intensity value in the image region of the other individual image by integrating the recorded intensities of relevant image elements of the other individual image; and
    f) ascertaining an adjusted fluorescence intensity as a difference between the first intensity value and the second intensity value;
    g) ascertaining a second adjusted fluorescence intensity for a second partial region of the isolated intensity distribution on the basis of steps a) to f), wherein the second partial region is different from the first partial region, in particular smaller than it and in particular is contained in it, and for ascertaining the second intensity value either i) the recorded intensities of the image elements of the relevant image region in the individual image or in the other individual images are integrated, or ii) the second intensity value for the first partial region is scaled to the area of the second partial region; and
    h) ascertaining a coordinate value for the emitter on the basis of the first adjusted fluorescence intensity and the second adjusted fluorescence intensity, in particular on the basis of a quotient of the first adjusted fluorescence intensity and the second adjusted fluorescence intensity.

21. The method as claimed in claim 20, wherein the first partial region and the second partial region have identical shapes, in particular circular areas, but are of different sizes, in particular in concentric arrangement in relation to one another.

22. The method as claimed in claim 20, wherein in step a), two individual images with focal positions that differ in the third spatial dimension are recorded simultaneously, in particular by splitting a detection beam path into two sections of different optical path lengths up to the detection, in particular into different regions of the same detector.

23. The method as claimed in claim 20, wherein before step h), the second adjusted fluorescence intensity is corrected or substituted by means of curve fitting on the basis of a model function for the intensity distribution in the second partial region, wherein the originally ascertained second adjusted fluorescence intensity is used in the curve fitting.

24. The method as claimed in claim 20, wherein the coordinate value is ascertained based on specified calibration values, in particular using a saved table of quotients of fluorescence intensities for different coordinate values in the third dimension.

25. The method as claimed in claim 24, wherein, for recording the microscope image, the sample is irradiated by means of at least one light source and recorded in a diffraction-limited manner by means of a light receiver such that at least one fluorescence event occurs that causes in the recorded image at least one isolated intensity distribution having a diffraction-related extent which corresponds to an extent of a point spread function of the microscope.

* * * * *

UNITED STATES PATENT AND TRADEMARK OFFICE
CERTIFICATE OF CORRECTION

| | |
|---|---|
| PATENT NO. | : 11,231,576 B2 |
| APPLICATION NO. | : 16/461908 |
| DATED | : January 25, 2022 |
| INVENTOR(S) | : Christian Franke, Markus Sauer and Sebastian van de Linde |

It is certified that error appears in the above-identified patent and that said Letters Patent is hereby corrected as shown below:

In the Specification

Column 1, Line 19      now reads: "sional individual images off sample are recorded using a"
should read -- sional individual images of a sample are recorded using a --

Column 1, Line 38      now reads: "of other emitters if the intensity distributions lie above the"
should read -- of other emitters - if the intensity distributions lie above the --

Column 2, Line 48      now reads: "recorded in, an individual image. There are also the methods"
should read -- recorded in an individual image. There are also the methods --

Column 2, Line 64      now reads: "tion in TIRE Microscopy" by S.J. Holden et al, in Bio-"
should read -- tion in TIRF Microscopy" by S.J. Holden et al, in Bio- --

Column 2, Line 66      now reads: "However. AP exhibits relatively large errors. In addition, the"
should read -- However, AP exhibits relatively large errors. In addition, the --

Column 3, Line 17      now reads: "first, optically elaborate approach is based the formation of"
should read -- first, optically elaborate approach is based on the formation of --

Column 4, Line 8      now reads: "value in a (first) partial region of the isolated intensity"
should read -- value - in a (first) partial region of the isolated intensity --

Column 4, Line 23      now reads: "intensity value in the image region of the other indi-"
should read -- intensity value - in the image region of the other indi- --

Column 4, Line 52      now reads: "as in WO 2006/127692 A2 or US 20091242798 A1; Expe-"
should read -- as in WO 2006/127692 A2 or US 2009/242798 A1; Expe- --

Signed and Sealed this
Twenty-eighth Day of June, 2022

Katherine Kelly Vidal
*Director of the United States Patent and Trademark Office*

CERTIFICATE OF CORRECTION (continued)
U.S. Pat. No. 11,231,576 B2

| | |
|---|---|
| Column 5, Line 34 | now reads: "sity h on the basis of a first intensity value $I_{raw,\,1}$ and a second"<br>should read -- sity $I_1$ on the basis of a first intensity value $I_{raw,\,1}$ and a second -- |
| Column 5, Line 44 | now reads: "contained in it, and for ascertaining, the second inten-"<br>should read -- contained in it, and for ascertaining the second inten- -- |
| Column 6, Line 16 | now reads: "containing, the adjusted intensity $I_{1'}$, and the second partial"<br>should read -- containing the adjusted intensity $I_{1'}$, and the second partial -- |
| Column 6, Line 61 | now reads: "(2003), or in "Image analysis, of defocused single-molecule"<br>should read -- (2003), or in "Image analysis of defocused single-molecule -- |
| Column 6, Line 63 | now reads: "by D. Patra et al. in J. Phys. Chem. A 1.08, 6836-6841"<br>should read -- by D. Patra et al. in J. Phys. Chem. A 108, 6836-6841 -- |
| Column 7, Line 2 | now reads: "characteristic variable. For such a method fir evaluating a"<br>should read -- characteristic variable. For such a method for evaluating a -- |
| Column 7, Line 21 | now reads: "intensity value and of the second intensity value. In"<br>should read -- intensity value and of the second intensity value, in -- |
| Column 7, Line 47 | now reads: "causes in the recorded, image at least one isolated intensity"<br>should read -- causes in the recorded image at least one isolated intensity -- |
| Column 8, Line 31 | now reads: "according to the invention and connected to the light source,"<br>should read -- according to the invention and connected to the light source -- |
| Column 8, Line 42 | now reads: "In the drawings;"<br>should read -- In the drawings: -- |
| Column 9, Line 9 | now reads: "module L with lasers 23, a scanning module 5, a detection"<br>should read -- module L with lasers 23, a scanning module S, a detection -- |
| Column 9, Line 29 | now reads: "diaphragms (not depicted here) instead of, pinhole stops 31,"<br>should read -- diaphragms (not depicted here) instead of pinhole stops 31, -- |
| Column 10, Line 10 | now reads: "For recording an, individual image with a sufficiently low"<br>should read -- For recording an individual image with a sufficiently low -- |
| Column 11, Line 59 | now reads: "regions and, for illustrative purposes, the different, extents of"<br>should read -- regions and, for illustrative purposes, the different extents of -- |
| Column 12, Line 1 | now reads: "ments, in the areas $A_1$ and $A_2$ are integrated to respective raw"<br>should read -- ments in the areas $A_1$ and $A_2$ are integrated to respective raw -- |

CERTIFICATE OF CORRECTION (continued)
U.S. Pat. No. 11,231,576 B2

| | |
|---|---|
| Column 12, Line 43 | now reads: "first, as a function of the size of the first partial region and" <br> should read -- first as a function of the size of the first partial region and -- |
| Column 12, Line 59 | now reads: "axial position of an individual, emitter, ascertained by means" <br> should read -- axial position of an individual emitter, ascertained by means -- |
| Column 13, Line 5 | now reads: "section A) and the photometric characteristic variable. P2" <br> should read -- section A) and the photometric characteristic variable P2 -- |
| Column 13, Line 26 | now reads: "changes, may be made without departing in any way from" <br> should read -- changes may be made without departing in any way from -- |
| Column 13, Line 59 | now reads: "Scanning module" <br> should read -- S Scanning module -- |